United States Patent
Cho et al.

(10) Patent No.: US 7,863,360 B2
(45) Date of Patent: Jan. 4, 2011

(54) ACRYLIC PRESSURE SENSITIVE ADHESIVE COMPOSITIONS

(75) Inventors: Hyun Ju Cho, Gyeongsangnam-do (KR); Jang Soon Kim, Daejeon (KR); Suk Ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/447,142

(22) Filed: Jun. 6, 2006

(65) Prior Publication Data

US 2006/0279922 A1 Dec. 14, 2006

(30) Foreign Application Priority Data

Jun. 8, 2005  (KR) .................. 10-2005-0048866

(51) Int. Cl.
  *C08K 5/00* (2006.01)
  *C08F 20/06* (2006.01)
  *C08F 118/02* (2006.01)

(52) U.S. Cl. ............... 524/236; 526/317.1; 526/319

(58) Field of Classification Search .......... 524/236; 526/317.1, 319

See application file for complete search history.

(56) References Cited

U.S. PATENT DOCUMENTS

| 3,574,029 | A | * | 4/1971 | Ettre ..................... 156/231 |
| 3,769,151 | A | * | 10/1973 | Knutson et al. ............. 428/442 |
| 6,194,317 | B1 | * | 2/2001 | Kaisaki et al. ............. 438/692 |
| 2002/0019454 | A1 | * | 2/2002 | Kanai et al. ................. 522/64 |

FOREIGN PATENT DOCUMENTS

| JP | 5140519 | | 8/1993 |
| JP | 06033019 A | * | 2/1994 |
| JP | 06128539 A | * | 5/1994 |
| JP | 6128539 | | 10/1994 |
| JP | 2004287199 | | 10/2004 |
| JP | 2005023143 A | * | 1/2005 |
| WO | WO 03011958 | | 2/2003 |

* cited by examiner

*Primary Examiner*—Michael M Bernshteyn
(74) *Attorney, Agent, or Firm*—McKenna Long & Aldridge LLP

(57) ABSTRACT

The present invention relates to an acrylic pressure sensitive adhesive composition, specifically, an acrylic pressure sensitive adhesive composition having improved anti-static properties, comprising acrylic copolymers, chelating agent which may form a bond with metal ion; and alkali metal salts, and prevent whitening appearance under high temperature and humidity condition as well as static electricity without change of the durability, transparency, and adhesion.

17 Claims, No Drawings

ACRYLIC PRESSURE SENSITIVE ADHESIVE COMPOSITIONS

This application claims the benefit of Korean Patent Application No. 10-2005-0048866 filed Jun. 8, 2005 in Korea, which is hereby incorporated by reference in its entirety.

TECHNICAL FIELD

The present invention relates to an acrylic pressure sensitive adhesive composition. Specifically, the present invention relates to an acrylic pressure sensitive adhesive composition having improved anti-static property which can prevent static electricity enough without change of the durability, transparency, and adhesion, and without whitening appearance under high temperature and humidity.

BACKGROUND ART

Generally, static electricity means tribo-electrification generated by rubbing two different objects, or peeling static electrification generated by separating two adhered objects. Static electricity can cause suction of foreign particles such as dust, electrostatic destruction of a device, malfunction of a measuring instrument, fire, etc. Specifically, the demand of liquid crystal display (LCD) has been remarkably increased due to wide spread of a mobile type of computer, expansion of liquid crystal TV or mobile phone having multi function, etc. As each assembly device is integrated and becomes vulnerable to static electricity, it is more important to inhibit generation of static electricity.

By the increased demand of LCD, the demand of optical films such as polarizer has been rapidly increased, thereby requiring high speediness of the LCD preparation process. Also, up to now, major LCD makers have concentrated on producing small panels less than 20 inches, but now expanding rapidly the production range to large sizes over 20 inches thanks to high technology.

Particularly, the size of polarizer used for the LCD production becomes larger, as the LCD size becomes larger. And, as the LCD preparation process becomes speedier, static electricity is excessively generated when the releasing film is peeled. Such generated static electricity affects the orientation of liquid crystal in the LCD to cause image defect.

Nowadays, the surface treatment of polarizer is done in various ways. The surface treatment of polarizer includes anti-glare layer, low and/or high reflection layer, anti-fouling layer, etc., and each layer has different surface roughness and surface energy. Particularly, the anti-glare layer has higher surface roughness and lower surface energy than triacetylcellulose (TAC) layer, and so the wetting property of the pressure sensitive adhesive is important when a protective film is adhered thereto. Also, as the preparation process of polarizer is conducted in high speed, TFT IC device causing malfunction of display panel may be destroyed by static electricity which is not generated in the conventional process, at the time of peeling the protective film of polarizer.

In order to prevent generation of static electricity as explained above, a method of forming anti-static layer on an exterior surface of polarizer or protective film was proposed, but the effect was not good enough, and could not prevent generation of static electricity basically. Therefore, the anti-static function is needed for the pressure sensitive adhesive to prevent generation of static electricity completely.

Conventional methods for providing the anti-static function of the pressure sensitive adhesive include a method of adding conductive components such as conductive metal powder or carbon particle, or a method of adding a surfactant type of ionic or anionic material. However, the method of adding metal powder or carbon particle had a disadvantage that transparency of the pressure sensitive adhesive layer is decreased since a large amount of metal powder or carbon particle should be used to provide the anti-static function. Also, the method of adding a surfactant type of ionic or anionic material had disadvantages that it is vulnerable to humidity, and adhesive property is decreased due to the migration of surfactant to a surface of the pressure sensitive adhesive.

Also, a method of discharging static electricity in the generation process by applying static eliminator has been proposed, but has a disadvantage to decrease the productivity due to limitation of the discharging capacity and lowering of the process speed.

Also, Japanese Patent Publication No. 1993-140519 discloses a method for preventing generation of static electricity by adding plasticizer of ethyleneoxide-modified phtalic acid dioctyl in the pressure sensitive adhesive. However, the method has disadvantages that the plasticizer is migrated to the surface of polarizer, and it is difficult to inhibit static electricity generated in the beginning.

Korean Patent Publication No. 2004-0030919 discloses a method of preparing an antistatic pressure sensitive adhesive comprising at least about 5% by weight of the organic salt to have the surface resistivity of less than about $10^{13}$ Ω/□. However, this method has disadvantages that expensive organic salt should be used, and the change of constant-voltage generated in the peeling process cannot be predicted since the method decreases only the surface resistivity.

Japanese Patent Publication No. 2004-287199 discloses a method for providing anti-static property by adding ion-conductive polymer having carboxyl group. However, the method has disadvantages that the ion-conductive polymer react with a conventional crosslinking agent (isocyanate) to change the adhesive and rheology property, and thus it is difficult to control the anti-static property and adhesive strength.

Also, Japanese Patent Publication No. 1994-128539 discloses a method for providing anti-static property by mixing polyether polyol compounds and one or more alkali metal salts. However, this method has disadvantages that when the crosslinking agent is isocyanate, the use of polyether polyol compounds may affect the degree of crosslinking, and the adhesive property may be decreased by ether linkage, i.e., the migration due to the hydrophilic property of ethyleneoxide.

DISCLOSURE OF THE INVENTION

To solve the problems in the prior art explained above, one object of the present invention is to provide an acrylic pressure sensitive adhesive composition having improved anti-static property, which can prevent static electricity enough without change of the durability, transparency, and adhesion, and without whitening appearance under high temperature and humidity.

Another object of the present invention is to provide a polarizer, a protective film and a liquid crystal display containing the above acrylic pressure sensitive adhesive composition having good anti-static property without change of the durability, transparency, and adhesion.

In order to achieve these objects, the present invention provides an acrylic pressure sensitive adhesive composition comprising:

a) acrylic copolymers;

b) chelating agent which may form a bond with metal ion; and c) alkali metal salts.

The present invention also provides a polarizer comprising the acrylic pressure sensitive adhesive composition on one side or both sides of a polarizing film as pressure sensitive adhesive layer.

The present invention also provides a protective film comprising the acrylic pressure sensitive adhesive composition on one side or both sides of a substrate.

The present invention also provides a liquid crystal display comprising a liquid crystal panel in which the above polarizer and/or a polarizer including the above protective film is adhered onto one side or both sides of the liquid crystal cell.

BEST MODE FOR CARRYING OUT THE INVENTION

Hereinafter, the present invention will be described in more detail.

The present inventor found out that the generation of static electricity can be fully prevented by applying both chelating agent which has good compatibility with pressure sensitive adhesive and in which at least one ligand can make one or more bonds with metal ion, and alkali metal salts which can form chelate compound by bonding the above chelating agent, to the acrylic pressure sensitive adhesive at the same time, and completed the present invention.

The acrylic pressure sensitive adhesive composition according to the present invention is characterized in comprising, a) 100 part by weight of acrylic copolymers; b) 0.01 to 25 part by weight of chelating agent which may form a bond with metal ion; and c) 0.001 to 25 part by weight of alkali metal salts.

The acrylic copolymers of the above a) used in the present invention are not limited if they can be used as pressure sensitive adhesive in the art. The acrylic copolymers prepared by copolymerizing i) 90~99.9 wt % of (meth)acrylic acid ester monomers having alkyl group of 1~12 carbon atoms and ii) 0.1 to 10 wt % of vinyl monomers, and/or acrylic monomers having cross-linkable functional groups, may be the acrylic copolymers.

As the above (meth)acrylic acid ester monomers having alkyl group of 1~12 carbon atoms of the above i), there may be alkyl ester of 1~12 carbon atoms of acrylic acid (or methacrylic acid), particularly, butyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, n-tetradecyl (meth)acrylate, 2-ethylhexyl (meth)acrylate, isooctyl (meth)acrylate, isononyl (meth)acrylate, 2-ethylbutyl (meth)acrylate, or the mixture thereof.

The above (meth)acrylic acid ester monomers having alkyl group of 1~12 carbon atoms may be used by copolymerizing with co-monomer having high glass transition temperature to provide adhesive strength and cohesive strength of the acrylic copolymers.

As the co-monomer above, any conventional monomer having vinyl group, particularly, methyl acrylate, methyl methacrylate, ethyl methacrylate, vinyl acetate, styrene, or acrylonitrile monomer may be used. All the above kinds of co-monomer may be used as long as the acrylic adhesive resins have −130~50° C. of glass transition temperature in the non-closslinked state.

The above vinyl monomers and/or acrylic monomers having cross-linkable functional groups in the ii) above react with crosslinking agent and play a role to provide adhesive strength and cohesive strength by chemical bond in order to prevent destruction of cohesive strength of the pressure sensitive adhesive under high temperature or humidity condition.

As the vinyl monomers and/or acrylic monomers having cross-linkable functional groups, it is preferable to use one or more selected from the group consisting of hydroxyalkyl (meth)acrylate, hydroxyalkyleneglycol(meth)acrylate, and ethylenically unsaturated monomer having one or more carboxlic acid or nitrogen atom. Particularly, monomer having hydroxy group, such as 2-hydroxyethyl (meth)acrylate, 2-hydroxypropyl (meth)acrylate, 4-hydroxybutyl (meth)acrylate, 6-hydroxyhexyl (meth)acrylate, 2-hydroxyethyleneglycol (meth)acrylate, or 2-hydroxypropyl eneglycol(meth)acrylate; monomer having carboxylic group, such as (meth)acrylic acid, maleic acid, or fumaric acid; monomer having nitrogen atom such as N-vinyl caprolactam, acrylamide, or N-vinyl pyrrolidone may be used alone or in mixture thereof.

Among the acrylic copolymers, the preferable content of vinyl monomers and/or acrylic monomers having cross-linkable functional groups is 0.1 to 10 wt %. When the content is less than 0.1 wt %, the destruction of cohesive strength may be easily occurred under high temperature or humidity condition. And, when the content is more than 10 wt %, the flowability may be decreased due to low compatibility.

The acrylic copolymer of the present invention can be prepared by conventional methods such as solution polymerization, photo-polymerization, bulk polymerization, suspension polymerization, and emulsion polymerization, and particularly solution polymerization is preferable. Here, it is preferable to set the polymerization temperature between 50-140° C., and to mix an initiator after monomers are evenly mixed.

The chelating agent which may form a bond with metal ion in the above b) and alkali metal salts of the above c) used in the present invention have a function to decrease the generation of static electricity.

The chelating agent of the above b) used in the present invention is a compound having fictional group which may form a bond with metal ion in the molecule structure. The above chelating agent binds with metal salt of cation which is dissociated into anion and cation, to form chelate compound. Then, the concentration of metal salt of anion is increased in the pressure sensitive adhesive, from which the pressure sensitive adhesive composition has ion-conductivity. This ion-conductivity provides the pressure sensitive adhesive composition with the conductive property, and decrease static electricity generated at the time of peeling the releasing film which protect the pressure sensitive adhesive layer, or peeling the protective film adhered to an object, thereby lowering the peeling static electrification voltage.

The chelating agent of the above b) is preferable to have high solubility in conventional organic solvents, such as ethylacetate, toluene, methylethylketone, acetone, or alcohols; and high compatibility with acrylic pressure sensitive adhesive. Particularly preferable examples of the chelating agent are compound having oxalate group, compound having diamine group, compound having polycarboxylic group, or compound having β-ketone group, which may be used alone or in mixture thereof. It is more preferable to use compound having oxalate group.

The preferable compound having oxalate group may be represented by the following formula (1):

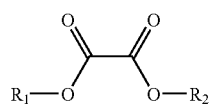
(1)

wherein, $R_1$ and $R_2$ are each independently hydrogen, halogen, branched or straight chain alkyl group of 1~20 carbon atoms, branched or straight chain alkoxy group of 1~20 carbon atoms, branched or straight chain alkenyl group of 2~20 carbon atoms, aryl group of 6~30 carbon atoms, arylalkyl group of 6~30 carbon atoms, aryloxy group of 6~30 carbon atoms, or cycloalkyl group of 5~20 carbon atoms.

Specific examples of the compound represented by the above formula (1) are diethyloxalate, dimethyloxalate, dibutyloxalate, di-tert-butyloxalate, or bis(4-methylbenzyl)oxalate.

The preferable compound having diamine group may be represented by the following formula (2):

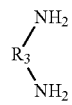
(2)

wherein, $R_3$ is branched or straight chain alkylene group of 1~20 carbon atoms, or branched or straight chain alkenylene group of 2~20 carbon atoms.

The compound represented by the above formula (2) may be ethylenediamine, 1,2-diaminopropane, or diaminobutane.

The compound having polycarboxylic group has polycarboxylic acid or carboxylate, and functional groups represented by the following formula (3a), (3b) or (3c):

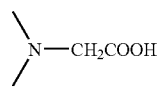
(3a)

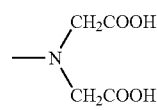
(3b)

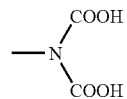
(3c)

The compound having functional groups represented by the formula (3a) or (3b) may be ethylenediamine-N,N,N',N'-tetraacetic acid(EDTA), N,N,N',N'',N''-diethylenetriaminepentaacetic acid(DTPA), 1,4,7,10-tetraazacyclododecane-N,N',N'',N'''-tetraacetic acid(DOTA), 1,4,7,10-tetraazacyclododecane-N,N',N''-triacetic acid(DO3A), trans (1,2)-cyclohexano diethylenetriaminepentaacetic acid, or N,N-biscarboxymethylglycine.

The compound having functional groups represented by the formula (3c) may be the compounds represented by the following formulae (3c-1) to (3c-5).

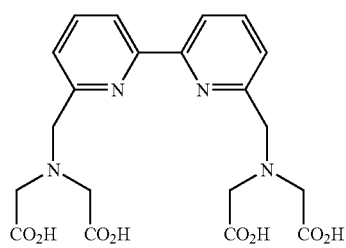
(3c-1)

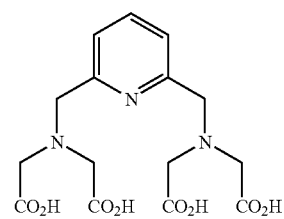
(3c-2)

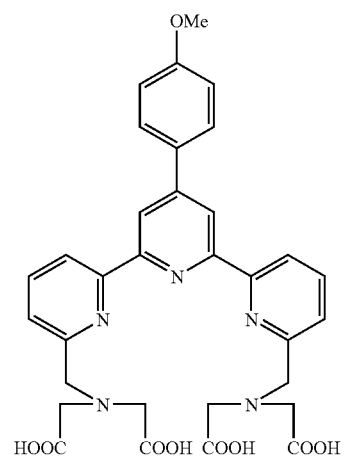
(3c-3)

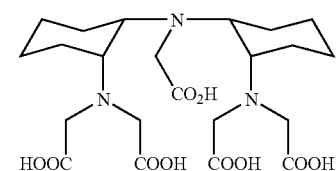
(3c-4)

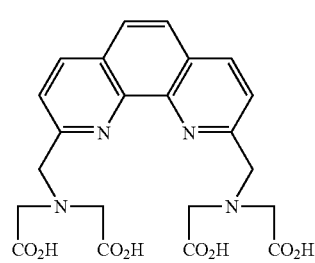
(3c-5)

The preferable compound having β-ketone group may be represented by the following formula (4):

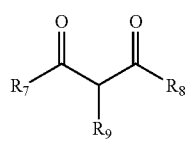

(4)

wherein, $R_7$ and $R_8$ are each independently branched or straight chain alkyl group of 1~20 carbon atoms, branched or straight chain alkoxy group of 1~20 carbon atoms, branched or straight chain alkenyl group of 2~20 carbon atoms, aryl group of 6~30 carbon atoms, arylalkyl group of 6~30 carbon atoms, aryloxy group of 6~30 carbon atoms, or cycloalkyl group of 5~20 carbon atoms, and $R_9$ is hydrogen or branched or straight chain alkyl group of 1~20 carbon atoms, branched or straight chain alkoxy group of 1~20 carbon atoms, branched or straight chain alkenyl group of 2~20 carbon atoms, aryl group of 6~30 carbon atoms, arylalkyl group of 6~30 carbon atoms, aryloxy group of 6~30 carbon atoms, or cycloalkyl group of 5~20 carbon atoms.

The compound represented by the above formula (4) may be 2,4-pentadione, 1-benzoylacetone, or ethyl acetoacetate.

The preferable content of chelating agent which may form a bond with metal ion is 0.01 to 25 part by weight based on the 100 part by weight of the acrylic copolymers. When the content is less than 0.01 part by weight, the chelating agent cannot fully bind with alkali metal salts to decrease anti-static function. And, when the content is more than 25 part by weight, the durability may be decreased due to low cohesive property.

The alkali metal salts of the above c) used in the present invention include metal cation which can bind with the chelating agent.

In the preferable alkali metal salts, metal ion can be easily dissociated from the salts when the metal salts are mixed with solvent or chelating agent. In this case, it is more preferable that the metal ion has small ionic radius and low dissociation energy.

Particularly, the metal cation of the alkali metal salts may be lithium, sodium, potassium, magnesium, calcium, barium, or cesium. And, the anion of the alkali metal salts may be exemplified by $Cl^-$, $Br^-$, $I^-$, $BF_4^-$, $PF_6^-$, $AsF_6^-$, $ClO_4^-$, $NO_2^-$, $CO_3^-$, $N(CF_3SO_2)_2^-$, $N(CF_3CO)_2^-$, $N(C_2F_5SO_2)_2^-$, $N(C_2F_5CO)_2^-$, $N(C_4F_9SO_2)_2^-$, $C(CF_3SO_2)_3^-$, $CF_3SO_3^-$ and the like.

The preferable content of alkali metal salts is 0.001 to 25 part by weight based on the 100 part by weight of the acrylic copolymers. When the content is less than 0.001 part by weight, the alkali metal salts cannot fully bind with chelating agent to decrease anti-static function. And, when the content is more than 25 part by weight, the transparency and durability may be decreased due to crystallization.

The acrylic pressure sensitive adhesive composition of the present invention comprising acrylic copolymers, chelating agent which may form a bond with metal ion, and alkali metal salts may further contain a crosslinking agent.

Depending on the content of crosslinking agent, the adhesive characteristic of the pressure sensitive adhesive may be controlled, and the crosslinking agent has a function to increase cohesion of the pressure sensitive adhesive by reacting with carboxyl and hydroxy.

The crosslinking agent can be selected from isocyanate, epoxy, aziridine, metal chelate crosslinking agents, etc, and particularly isocyanate crosslinking agent is preferred.

Specifically, the isocyanate crosslinking agent may be tolylene diisocyanate, xylene diisocyanate, diphenylmethane diisocyanate, hexamethylene diisocyanate, isoform diisocyanate, tetramethylxylene diisocyanate, naphthalene diisocyanate, or their reactants with polyol like trimethylolpropane.

The epoxy crosslinking agent may be ethyleneglycol diglycidylether, triglycidylether, trimethylolpropane triglycidylether, N,N,N'N'-tetraglycidylethylenediamine, or glycerine diglycidylether.

The aziridine crosslinking agent may be N,N'-toluene-2,4-bis(1-aziridinecarboxide), N,N'-diphenylmethane-4,4'-bis(1-aziridinecarboxide), triethylenemelamine, bisisoprotaloyl-1-(2-methylaziridine), or tri-1-aziridinylphosphineoxide.

As metal chelate crosslinking agent, compounds prepared by coordinating multivalent metal such as Al, Fe, Zn, Sn, Ti, Sb, Mg, and V with acethylacetone or ethyl acetoacetate can be used.

The preferable content of crosslinking agent is 0.01 to 10 part by weight based on the 100 part by weight of the acrylic copolymers. When the content is less than 0.01 part by weight, the durability may be decreased due to insufficient cohesive strength. And, when the content is more than 10 part by weight, the wetting property of a subject may be remarkably decreased due to the decreased adhesive property.

The pressure sensitive adhesive composition of the present invention can additionally include silane coupling agent which can enhance thermal/moisture resistance by improving pressure sensitive adhesive stability on a glass substrate. The silane coupling agent has a function to increase the stability of adhesive property when it is left for a long time under high temperature and high humidity.

The silane coupling agent may be ɤ-glycydoxypropyl trimethoxysilane, ɤ-glycydoxypropyl methyldiethoxysilane, ɤ-glycydoxypropyl triethoxysilane, 3-mercaptopropyl trimethoxysilane, vinyl trimethoxysilane, vinyl triethoxysilane, ɤ-methacryloxypropyl trimethoxysilane, ɤ-methacryloxypropyl triethoxysilane, ɤ-aminopropyl trimethoxysilane, ɤ-aminopropyl triethoxysilane, 3-isocyanatepropyl triethoxysilane, or ɤ-acetoacetatepropyl trimethoxysilane. These silane coupling agents can be used alone or in mixture thereof.

The preferable content of silane coupling agent is 0.005-5 part by weight based on 100 part by weight of an acrylic copolymer to improve stable durability and adhesive property.

In addition, the acrylic pressure sensitive adhesive composition of the present invention, if necessary, may further include tackifier, acrylic low molecular weight substances, epoxy resins, curing agent, UV stabilizers, antioxidants, coloring agents, reinforcing agents, fillers, antifoaming agents, surfactants, plasticizer, blowing agent, or organic salts.

The preparation method of the pressure sensitive adhesive composition of the present invention having the above components is not specifically limited. At this time, in the mixing process to form the pressure sensitive adhesive layer, a crosslinking reaction of functional groups of a crosslinking agent should not be occurred for even coating. After the coating followed by dryness and aging, a crosslinking structure is formed, thereby obtaining a pressure sensitive adhesive layer having strong elasticity and cohesion. Here, by the strong cohesion of pressure sensitive adhesive, the pressure sensitive adhesive property such as stable durability of a pressure sensitive adhesive product and the cutting characteristic are enhanced.

The proper crosslinking density of the acrylic pressure sensitive adhesive composition of the present invention is 10-99%. When the crosslinking density of the pressure sensitive adhesive is less than 10%, the cohesion of the pressure sensitive adhesive is reduced, and, when the crosslinking density is more than 99%, the stable durability is reduced.

The present invention further provides a polarizer containing the acrylic pressure sensitive adhesive composition as a pressure sensitive adhesive layer of a polarizing film. The polarizer of the present invention consists of a pressure sensitive adhesive layer formed from the pressure sensitive adhesive composition of the invention on one side or both sides of the polarizing film.

Polarizing film or polarizing device forming the above polarizer is not specifically limited. For example, the above polarizing film prepared by adding a polarizing component such as iodine or dichroic dye onto polyvinyl alcohol resin film and elongating it may be used. Also, there is no limitation in the thickness of polarizing film, and so the film may be made in conventional thickness. As a polyvinyl alcohol resin, polyvinyl alcohol, polyvinyl formal, polyvinyl acetal and ethylene, saponified vinyl acetate copolymer, etc. can be used.

On both sides of the polarizing film, multilayer films may be formed. The multilayer films are made by laminated protective films such as cellulose films like triacetyl cellulose, etc; polyester films like polycarbonate film, polyethylene terephthalate, etc; polyether sulphone films; polyolefin films having the structure of polyethylene or polypropylene, and polyolefine films having cyclo or norbomene structure, or ethylene propylene copolymer. The thickness of such protective films is not limited specifically, and conventional thickness may be accepted.

The polarizer of the present invention can include one or more additional layers providing supplementary functions, such as protective layer, reflecting layer, anti-glare film, phase retardation film, compensation film for wide view angle, and brightness enhancing film.

The present invention still further provides a protective film comprising the acrylic pressure sensitive adhesive composition of the present invention as adhesive layer of the substrate layer.

The above protective film includes an optical sheet, particularly transparent substrate for protecting an outmost layer, and a pressure sensitive adhesive layer. In the process for preparing the above protective film, the pressure sensitive adhesive layer formed by the pressure sensitive adhesive composition may be coated on one side or both sides of the substrate, and there is no limitation in the kind of transparent substrate film.

The above transparent substrate film may have a single layer or two or more laminated layers, and the thickness of the substrate film may be varied depending on usage, but the preferable thickness is 5~500 μm, and a more preferable thickness is 15~100 μm.

Also, the transparent substrate film may be treated with surface-treatment or primer-treatment on one side or both sides to enhance the adherent property between substrate and pressure sensitive adhesive layer, and may further include anti-static layer or anti-fouling layer.

The above method of forming the pressure sensitive adhesive layer on polarizing film is not limited. For example, the method may comprise the steps of coating the pressure sensitive adhesive directly on the surface of a polarizing film with Bar Coater and then drying it. Or, the method may comprise the steps of coating the pressure sensitive adhesive on the surface of dissecting substrate followed by drying, and transferring the pressure sensitive adhesive layer onto the surface of polarizing film, followed by aging. At that time, the preferable thickness of laminated adhesive layer is 2~100 μm, and a more preferable thickness is 5~50 μm. When the thickness of laminated adhesive layer is over the above range, the properties of the adhesive films may be uneven since it is difficult to prepare even adhesive layer.

The polarizer and/or protective film using the pressure sensitive adhesive of the present invention can be applied to every LCD generally used now, and the kind of liquid crystal panel is not limited. Preferably, the present invention can construct LCD to include liquid crystal panel prepared by conjugating the pressure sensitive adhesive polarizer and/or protective film to one side or both sides of liquid crystal cell.

The acrylic pressure sensitive adhesive resin composition of the present invention can be widely used without limitation, such as for industrial sheet, particularly protective film, reflective sheet, structural pressure sensitive adhesive sheet, photographic pressure sensitive adhesive sheet, lane marking pressure sensitive adhesive sheet, optical pressure sensitive adhesive product, or pressure sensitive adhesive for electronic components. The pressure sensitive adhesive composition can also be applied to equivalent fields using same principles such as multi-layer laminate products like general industrial pressure sensitive adhesive sheet products, medical patches, or heat activated pressure sensitive adhesives.

Preferred embodiments of the present invention are illustrated in the following Examples to help understanding on the present invention. However, it should be appreciated that those skilled in the art may make modifications and improvements within the spirit and scope of the present invention.

EXAMPLE 1

[Preparation of Acrylic Copolymers]

A monomer mixture composed of 98.0 part by weight of n-butylacrylate (BA), 0.5 part by weight of acrylic acid (AA), and 1.5 part by weight of hydroxyethylacrylate (2-HEA) was put into a 1 L reactor equipped with the reflux of nitrogen gas and the cooling system for the regulation of temperature, to which 100 part by weight of ethyl acetate (EAc) was added as a solvent. To remove oxygen therefrom, nitrogen gas was purged for 1 hour, during which the temperature was kept at 55° C., and then 0.05 part by weight of azobisisobutyronitrile (AIBN) which was diluted by 50% in ethyl acetate was added thereto as a reaction initiator. The mixture was reacted for 8 hours, resulting in the acrylic copolymer.

[Mixing and Coating Process]

To 100 part by weight of the acrylic copolymer prepared above, 0.5 part by weight of tolylene diisocyanate adduct of trimethylolpropane(TMP-TDI), 2.0 part by weight of dibutyloxalate(DBOX) as chelating agent, and 0.5 part by weight of $NaClO_4$ as alkali metal salts were added. The mixture was diluted properly, homogeneously mixed, coated on a releasing film, and dried, to obtain an even pressure sensitive adhesive layer having the thickness of 25 micron.

[Laminating Process for Polarizer]

185 micron thick iodine polarizer was coated with the pressure sensitive adhesive layer prepared above, and then the obtained product was aged under 23° C. and 55% of humidity for 4 days. The prepared polarizer was cut into proper sizes for evaluation.

EXAMPLES 2~8 AND COMPARATIVE EXAMPLES 1~5

Except using the component and ratio as shown in Table 1, acrylic copolymers were prepared by the same method as described in Example 1. The unit of Table 1 is part by weight.

TABLE 1

|  |  | Examples | | | | | | | | Comparative Examples | | | | |
|---|---|---|---|---|---|---|---|---|---|---|---|---|---|---|
|  |  | 1 | 2 | 3 | 4 | 5 | 6 | 7 | 8 | 1 | 2 | 3 | 4 | 5 |
|  | acrylic copolymers | 100 | 100 | 100 | 100 | 100 | 100 | 100 | 100 | 100 | 100 | 100 | 100 | 100 |
| Chelating Agent | DBOX | 2.0 | 2.0 | — | — | — | 0.5 | — | — | — | 2.0 | — | 2.0 | 2.0 |
|  | DEOX | — | — | 2.0 | — | — | — | 1.0 | — | — | — | — | — | — |
|  | EDA | — | — | — | 2.0 | — | — | — | — | — | — | — | — | — |
|  | EDTA | — | — | — | — | 2.0 | — | — | — | — | — | — | — | — |
|  | EAA | — | — | — | — | — | — | — | 2.0 | — | — | — | — | — |
| Metal Salts | NaClO$_4$ | 0.5 | — | — | — | — | — | — | — | — | — | 1.0 | — | — |
|  | Li(CF$_3$SO$_3$) | — | — | 0.5 | — | — | — | 0.5 | — | — | — | — | — | — |
|  | LiN(CF$_3$SO$_2$)$_2$ | — | 0.3 | — | 0.5 | 0.3 | 0.5 | 0.5 | 0.5 | — | — | — | 0.0001 | 30.0 |
| Cross-linking agent | TMP-TDI | 0.5 | 0.5 | 0.5 | 0.5 | 0.5 | 0.5 | 0.5 | 0.5 | 0.5 | 0.5 | 0.5 | 0.5 | 0.5 |

DBOX—dibutyloxalate
DEOX—diethyloxalate
EDA—ethylenediamine
EDTA—ethylenediaminetetraacetic acid
EAA—ethylacetoacetone
NaClO$_4$—sodiumperchlorate
Li(CF$_3$SO$_3$)—lithiumtriplate
LiN(CF$_3$SO$_2$)$_2$—lithiumtrifluoromathnaesulfoneimide
TMP-TDI—tolylene diisocyanate adduct of trimethylolpropane Stable durability, haze, surface resistance and peel strength of the polarizers prepared in Examples 1 to 8 and Comparative Examples 1 to 5 were examined by the following methods, and the results are shown in Table 2.

A. Durability

The polarizers (90 mm×170 mm) coated with the pressure sensitive adhesive prepared in Examples 1 to 8 and Comparative Examples 1 to 5 were attached onto both sides of a glass substrate (110 mm×190 mm×0.7 mm) on which optical absorption axes were crossed. Here, approximately 5 kg/cm² of pressure was given in a clean room to prevent generations of bubbles and impurities. Those test samples were left at a high temperature (80° C. and 1000 hr) and under high humidity (60° C., 90% relative humidity, and 1,000 hr) and observed whether bubbles or edge lifting is occurred, to measure moisture and heat resistances according to the evaluation criteria for durability as follows.

| Evaluation criteria | |
|---|---|
| ○ | No bubbles or edge lifting was observed. |
| Δ | A few bubbles or edge lifting was observed. |
| X | A large amount bubbles or edge lifting was observed. |

B. Haze

The polarizers prepared in Examples 1 to 8 and Comparative Examples 1 to 5 were cut by 40 mm×70 mm, and the diffusion transmission rate (Td) and the total light transmission rate (Ti) were determined by using an integrated light transmission determining apparatus in accordance with ASTM D1003-95 and JIS K7150. Here, the haze value was defined by the percentage of Td for Ti. Those test samples were left at 60° C. of temperature and 90% relative humidity for 1,000 hr, and the haze values were determined by using the same method as the above. The whitening appearance was evaluated by comparing the haze values of those samples before and after the aging.

C. Surface Resistance

After separating the releasing film from the polarizer prepared in Examples 1 to 8 and Comparative Examples 1 to 5, the surface resistance of the pressure sensitive adhesive face was measured. Here, the surface resistance was measured after applying 500 V of electricity for 1 minute at 23° C., with 50% relative humidity.

D. Peel Strength

The Peel strength may be varied depending on angle and peel speed. However, the present peel strength was measured by using a tensile testing machine at the separation speed of 300 mm/min and an angle of 180°.

The polarizers of Example 1 to 8 and Comparative 1 to 5 were cut by 25 mm×150 mm, and attached onto a glass plate by 2 kg of rubber roll at 23° C. and under 65% relative humidity. The above samples were left for 4 hr, and the peel strength was determined.

TABLE 2

| | Durability | | Haxe (%) | Surface resistance ($\Omega/\square$) | Peel strength (gf/in) Glass |
|---|---|---|---|---|---|
| | 80° C., 1000 hr | 60° C., 90% RH, 1000 hr | | | |
| example 1 | ○ | ○ | 0.3 | $8.0 \times 10^{11}$ | 500 |
| example 2 | ○ | ○ | 0.2 | $3.1 \times 10^{10}$ | 480 |
| example 3 | ○ | ○ | 0.2 | $2.7 \times 10^{10}$ | 520 |
| example 4 | ○ | ○ | 0.2 | $1.2 \times 10^{11}$ | 450 |
| example 5 | ○ | ○ | 0.2 | $7.0 \times 10^{10}$ | 490 |
| example 6 | ○ | ○ | 0.2 | $4.0 \times 10^{12}$ | 510 |
| example 7 | ○ | ○ | 0.3 | $2.3 \times 10^{12}$ | 480 |
| example 8 | ○ | ○ | 0.2 | $1.5 \times 10^{11}$ | 490 |
| Comparative 1 | ○ | ○ | 0.2 | $>1.0 \times 10^{14}$ | 500 |
| Comparative 2 | ○ | ○ | 0.2 | $>1.0 \times 10^{14}$ | 460 |
| Comparative 3 | ○ | ○ | 25.6 | $1.0 \times 10^{11}$ | 520 |
| Comparative 4 | ○ | ○ | 0.2 | $>1.0 \times 10^{14}$ | 520 |
| Comparative 5 | x | x | 29.3 | $9.7 \times 10^{9}$ | 200 |

As shown in Table 2, the polarizers using the present acrylic pressure sensitive adhesives of Example 1 to 8 having both chelating agent and alkali metal salts can quickly remove the static electricity generated by peeling the release film since the surface resistance of the pressure sensitive adhesive is lower, compared with those of Comparative 1 to 5, and they have superior adhesive properties like durability and transparency.

EXAMPLE 9

[Preparation of Acrylic Copolymers]

A monomer mixture composed of 50.0 part by weight of 2-ethylhexylacrylate(2-EHA), 46.0 part by weight of n-butylacrylate (BA), 0.5 part by weight of acrylic acid (AA), and 4.0 part by weight of hydroxyethylacrylate (2-HEA) was put into a 1 L reactor equipped with the reflux of nitrogen gas and the cooling system for the regulation of temperature, to which 100 part by weight of ethyl acetate (EAc) was added as a solvent. To remove oxygen therefrom, nitrogen gas was purged for 1 hour, during which the temperature was kept at 55° C., and then 0.05 part by weight of azobisisobutyronitrile (AIBN) which was diluted by 50% in ethyl acetate was added as a reaction initiator. The mixture was reacted for 8 hours, resulting in the acrylic copolymer.

[Mixing and Coating Process]

To 100 part by weight of the acrylic copolymer prepared above, 3.0 part by weight of prepolymer of diisocyanate (HDI), 2.0 part by weight of dibutyloxalate(DBOX) as chelating agent, and 0.5 part by weight of $NaClO_4$ as alkali metal salts were added. The mixture was diluted properly, and homogeneously mixed. The mixture was coated on one side of the bi-axial elongated polyethyleneterephtalate film having 38 μm of thickness, and dried to obtain the even pressure sensitive adhesive layer having the thickness of 20 micron.

[Laminating Process for Protective Film]

The releasing film was laminated on the above pressure sensitive adhesive layer coated on the polyethyleneterephtalate film, and the product was aged under 23° C. and 55% of humidity condition for 4 days.

Thus prepared protective film was cut into proper sizes, and adhered onto the surface of treacetyl cellulose (TAC film, Fusi Film Co. of Janpan) and anti-glare film (AG TAC, DNP Co. of Japan) for evaluation.

EXAMPLE 10~16 AND COMPARATIVE EXAMPLES 6~10

Except using the component and ratio as shown in Table 3, acrylic copolymers were prepared by the same method as described in Example 9. The unit of Table 3 is part by weight.

TABLE 3

| | | Example | | | | | | | | Comparatives | | | | |
|---|---|---|---|---|---|---|---|---|---|---|---|---|---|---|
| | | 9 | 10 | 11 | 12 | 13 | 14 | 15 | 16 | 6 | 7 | 8 | 9 | 10 |
| Acrylic copolymers | | 100 | 100 | 100 | 100 | 100 | 100 | 100 | 100 | 100 | 100 | 100 | 100 | 100 |
| Chelating agent | DBOX | 2.0 | 2.0 | — | — | — | 0.5 | — | — | — | 2.0 | — | 2.0 | 2.0 |
| | DEOX | — | — | 2.0 | — | — | — | 1.0 | — | — | — | — | — | — |
| | EDA | — | — | — | 2.0 | — | — | — | — | — | — | — | — | — |
| | EDTA | — | — | — | — | 2.0 | — | — | — | — | — | — | — | — |
| | EAA | — | — | — | — | — | — | — | 2.0 | — | — | — | — | — |
| Metal salts | $NaClO_4$ | 0.5 | — | — | — | — | — | — | — | — | — | 1.0 | — | — |
| | $Li(CF_3SO_3)$ | — | — | 0.5 | — | — | — | 0.5 | — | — | — | — | — | — |
| | $LiN(CF_3SO_2)_2$ | — | 0.3 | — | 0.5 | 0.2 | 0.5 | 0.5 | 0.2 | — | — | — | 0.0001 | 30.0 |
| Crosslinking agent | HDI | 3.0 | 3.0 | 3.0 | 3.0 | 3.0 | 3.0 | 3.0 | 3.0 | 3.0 | 3.0 | 3.0 | 3.0 | 3.0 |

The abbreviation has the same meaning as in Table 1.

By using the protective film prepared in Examples 9 to 16 and Comparative Examples 6 to 10, the peeling static electrification voltage and peel strength were measured by the following methods, and the results are shown in Table 4. Here, the haze values were evaluated by the same method as described above.

E. Peel Static Electrification Voltage

The protective films prepared in Examples 9 to 16 and Comparative Examples 6 to 10 were adhered onto the surface of treacetyl cellulose (TAC film, Fusi Film Co. of Janpan) and anti-glare film (AG TAC, DNP Co. of Japan) by using 2 kg of roller, and the samples were left under 23° C. and 50% relative humidity condition. The size of the sample was 15 inch, and the constant-voltage generated from the surface was measured at the point of 1 cm over the surface by constant-voltage meter (STATIRON-M2) during the separation process at the speed of 40 mm/min. In order to improve accuracy, the constant-voltage value was measured 10 times, and their average value was shown.

F. 180° Peel Strength

The protective films prepared in Examples 9 to 16 and Comparative Examples 6 to 10 were adhered onto the surface of treacetyl cellulose (TAC film, Fusi Film Co. of Janpan) and anti-glare film (AG TAC, DNP Co. of Japan) by using 2 kg of roller, and the samples were left under 23° C. and 50% relative humidity condition for 24 hr. The strength was measured by using a tensile testing machine at the separation speed of 0.3 mm/min and the angle of 180°.

TABLE 4

|  | Peel static electrification voltage (kV) | | Haze | Peel Strength (gf/in) | |
| --- | --- | --- | --- | --- | --- |
|  | TAC | AG | (%) | TAC | AG |
| example 9 | 0.5 | −0.6 | 0.3 | 11 | 13 |
| example 10 | 0.3 | −0.2 | 0.2 | 10 | 12 |
| example 11 | 0.5 | −0.5 | 0.2 | 12 | 13 |
| example 12 | 0.2 | −0.3 | 0.2 | 11 | 11 |
| example 13 | 0.5 | 0.6 | 0.2 | 10 | 10 |
| example 14 | 0.4 | −0.5 | 0.2 | 11 | 13 |
| example 15 | 0.1 | −0.1 | 0.3 | 10 | 12 |
| example 16 | 0.2 | −0.3 | 0.2 | 11 | 12 |
| Comparative 6 | −4.0 | −4.5 | 0.2 | 12 | 14 |
| Comparative 7 | −4.0 | −4.5 | 0.2 | 12 | 14 |
| Comparative 8 | −3.5 | −3.5 | 25.6 | 11 | 11 |
| Comparative 9 | −4.0 | −5.0 | 0.2 | 12 | 13 |
| Comparative 10 | −3.0 | −3.0 | 29.3 | 11 | 4 |

As shown in Table 4, the protective films using the present acrylic pressure sensitive adhesives of Example 1 to 8 having both chelating agent and alkali metal salts did not induce malfunction of LCD since their static electrification voltage generated from the surface of polarizer during the separation process is lower, compared with those of Comparative Examples 6 to 10, and they have superior adhesive properties like durability and transparency.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

INDUSTRIAL APPLICABILITY

The acrylic pressure sensitive adhesive composition, polarizer, and protective film and LCD having the above composition of the present invention have improved anti-static properties which can prevent whitening appearance under high temperature and humidity condition as well as static electricity without change of the durability, transparency, and adhesion.

What is claimed is:

1. Acrylic pressure sensitive adhesive composition for a polarizer or a protective film for polarizer, comprising:
   a) 100 parts by weight of acrylic copolymers;
   b) 0.01 to 25 part by weight of chelating agent being capable of imparting an anti-static property into a pressure sensitive adhesive by forming a bond with a metal ion; and
   c) 0.001 to 25 part by weight of metal salts,
   wherein the chelating agent is at least one selected from the group consisting of a compound having an oxalate group, a compound having a diamine group, a compound having a polycarboxylic group and a compound having a β-ketone group.

2. The acrylic pressure sensitive adhesive composition for a polarizer or a protective film for polarizer of claim 1, wherein the acrylic copolymers in the above a) are prepared by copolymerizing i) 90 to 99.9 wt % of (meth)acrylic acid ester monomers having alkyl group of 1 to 12 carbon atoms, and ii) 0.1 to 10 wt % of vinyl monomers and/or acrylic monomers having cross-linkable functional groups.

3. The acrylic pressure sensitive adhesive composition for a polarizer or a protective film for polarizer of claim 2, wherein the (meth)acrylic acid ester monomers having alkyl group of 1 to 12 carbon atoms in the above i) are one or more selected from the group consisting of butyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, n-tetradecyl (meth)acrylate, 2-ethylhexyl (meth)acrylate, isooctyl (meth)acrylate, isononyl (meth)acrylate, and 2-ethylbutyl (meth)acrylate.

4. The acrylic pressure sensitive adhesive composition for a polarizer or a protective film for polarizer of claim 2, wherein the (meth)acrylic acid ester monomers having alkyl group of 1 to 12 carbon atoms in the i) above are mixed with one or more co-monomers selected from the group consisting of methyl acrylate, methyl methacrylate, ethyl methacrylate, vinyl acetate, styrene, and acrylonitrile.

5. The acrylic pressure sensitive adhesive composition for a polarizer or a protective film for polarizer of claim 2, wherein the vinyl monomers and/or acrylic monomers having cross-linkable functional groups in the above ii) above are one or more selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 2-hydroxyethyleneglycol (meth)acrylate, 2-hydroxypropyleneglycol (meth)acrylate, (meth)acrylic acid, maleic acid, fumaric acid, acrylamide, N-vinyl pyrrolidone, and N-vinyl caprolactam.

6. The acrylic pressure sensitive adhesive composition for a polarizer or a protective film for polarizer of claim 1, wherein the compound having oxalate group is represented by the following formula (1):

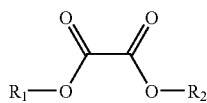

wherein,

R1 and R2 are each independently hydrogen, halogen, branched or straight chain alkyl group of 1 to 20 carbon atoms, branched or straight chain alkoxy group of 1 to 20 carbon atoms, branched or straight chain alkenyl group of 2 to 20 carbon atoms, aryl group of 6 to 30 carbon atoms, arylalkyl group of 6 to 30 carbon atoms, aryloxy group of 6 to 30 carbon atoms, or cycloalkyl group of 5 to 20 carbon atoms.

7. The acrylic pressure sensitive adhesive composition for a polarizer or a protective film for polarizer of claim 1, wherein the compound having oxalate group is one or more selected from the group consisting of diethyloxalate, dimethyloxalate, dibutyloxalate, di-tert-butyloxalate, and bis(4-methylbenzyl)oxalate.

8. The acrylic pressure sensitive adhesive composition for a polarizer or a protective film for polarizer of claim 1, wherein the compound having diamine group is represented by the following formula (2):

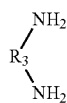

wherein R3 is branched or straight chain alkylene group of 1 to 20 carbon atoms, or branched or straight chain alkenylene group of 2 to 20 carbon atoms.

9. The acrylic pressure sensitive adhesive composition for a polarizer or a protective film for polarizer of claim 1, wherein the compound having diamine group is one or more selected from the group consisting of ethylenediamine and 1,2-diaminopropane.

10. The acrylic pressure sensitive adhesive composition for a polarizer or a protective film for polarizer of claim 1, wherein the compound having polycarboxylic group has functional groups represented by the following formula (3a), (3b) or (3c):

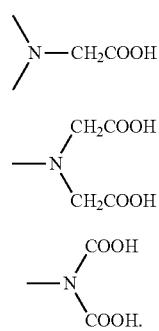

11. The acrylic pressure sensitive adhesive composition for a polarizer or a protective film for polarizer of claim 1, wherein the compound having polycarboxylic group is one or more selected from the group consisting of diethylenetriaminepentaacetic acid, ethylenediaminetetraacetic acid, and N,N-biscarboxymethylglycine.

12. The acrylic pressure sensitive adhesive composition for a polarizer or a protective film for polarizer of claim 1, wherein the compound having β-ketone group is represented by the following formula (4):

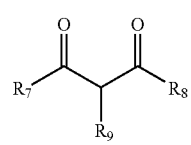

wherein,

R7 and R8 are each independently branched or straight chain alkyl group of 1 to 20 carbon atoms, branched or straight chain alkoxy group of 1 to 20 carbon atoms, branched or straight chain alkenyl group of 2 to 20 carbon atoms, aryl group of 6 to 30 carbon atoms, arylalkyl group of 6 to 30 carbon atoms, aryloxy group of 6 to 30 carbon atoms, or cycloalkyl group of 5 to 20 carbon atoms, and R9 is hydrogen or branched or straight chain alkyl group of 1 to 20 carbon atoms, branched or straight chain alkoxy group of 1 to 20 carbon atoms, branched or straight chain alkenyl group of 2 to 20 carbon atoms, aryl group of 6 to 30 carbon atoms, arylalkyl group of 6 to 30 carbon atoms, aryloxy group of 6 to 30 carbon atoms, or cycloalkyl group of 5 to 20 carbon atoms.

13. The acrylic pressure sensitive adhesive composition for polarizer or a protective film for polarizer of claim 1, wherein the compound having β-ketone group is one or more selected from the group consisting of 2,4-pentadione, 1-benzoylacetone, and ethyl acetoacetate.

14. The acrylic pressure sensitive adhesive composition for a polarizer or a protective film for polarizer of claim 1, wherein the metal salts in the c) consist of a metal cation selected from the group consisting of lithium, sodium, potassium, magnesium, calcium, barium and cesium, and an anion selected from the group consisting of Cl—, Br—, I—, BF4-, PF6-, AsF6-, ClO4-, NO2-, CO3-, N(CF3SO2)2-, N(CF3CO)2-, N(C2F5SO)2-, N(C2F5CO)2-, N(C4F9SO2)2-, C(CF3SO2)3-, and CF3SO3-.

15. The acrylic pressure sensitive adhesive composition for a polarizer or a protective film for polarizer of claim 1, wherein the composition further comprises multifunctional crosslinking agent.

16. The acrylic pressure sensitive adhesive composition for a polarizer or a protective film for polarizer of claim 15, wherein the multifunctional crosslinking agent is one or more selected from the group consisting of isocyanate, epoxy, aziridine and metal chelate compounds.

17. The acrylic pressure sensitive adhesive composition for a polarizer or a protective film for polarizer of claim 15, wherein the composition comprises 0.01 to 10 part by weight of multifunctional crosslinking agent based on 100 part by weight acrylic copolymers.

* * * * *